United States Patent
Stattin et al.

(10) Patent No.: US 11,916,925 B2
(45) Date of Patent: *Feb. 27, 2024

(54) METHOD FOR IMPROVING DATA TRANSMISSION SECURITY

(71) Applicant: TELEFONAKTIEBOLAGET LM ERICSSON (PUBL), Stockholm (SE)

(72) Inventors: Magnus Stattin, Upplands Vasby (SE); Vesa Lehtovirta, Espoo (FI); Prajwol Kumar Nakarmi, Sollentuna (SE); Dung Pham Van, Upplands Vasby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/100,349

(22) Filed: Jan. 23, 2023

(65) Prior Publication Data

US 2023/0239309 A1 Jul. 27, 2023

Related U.S. Application Data

(63) Continuation of application No. 16/963,239, filed as application No. PCT/IB2019/051199 on Feb. 14, 2019, now Pat. No. 11,563,749.

(Continued)

(51) Int. Cl.
*H04L 9/40* (2022.01)
*H04L 9/32* (2006.01)

(52) U.S. Cl.
CPC .......... *H04L 63/123* (2013.01); *H04L 9/3236* (2013.01); *H04L 63/0428* (2013.01)

(58) Field of Classification Search
CPC .. H04L 63/123; H04L 63/0428; H04L 9/3236

(Continued)

(56) References Cited

U.S. PATENT DOCUMENTS

| | | | |
|---|---|---|---|
| 8,800,049 B2* | 8/2014 | Michaelis | G06F 21/10 380/279 |
| 9,667,423 B2 | 5/2017 | Fu et al. | |

(Continued)

FOREIGN PATENT DOCUMENTS

| | | |
|---|---|---|
| CN | 105191479 A | 12/2015 |
| CN | 107251522 A | 9/2018 |
| RU | 2454832 C2 | 6/2012 |

OTHER PUBLICATIONS

3GPP, "3rd Generation Partnership Project; Technical Specification Group Radio Access Network; Evolved Universal Terrestrial Radio Access (E-UTRA); Packet Data Convergence Protocol (PDCP) specification (Release 14)", Technical Specification, TS 36.323 V14.4.0, Sep. 2017, pp. 1-43, 3GPP, France.

(Continued)

*Primary Examiner* — Dant B Shaifer Harriman
(74) *Attorney, Agent, or Firm* — Sage Patent Group

(57) ABSTRACT

A method for improving data transmission security at a user equipment comprises receiving, from a source network node, a connection release message including instructions for computing a hash value for data to be included in a connection request message; computing the hash value based on the instructions included in the connection release message; calculating a token based on the hash value, and sending, to a target network node, the connection request message including the token. The method may further forward the data from the target network node directly to a gateway after the token has been verified. The method may reduce a signaling overhead by having a fixed-size hash value for data. Furthermore, the method may improve a transmission security by including the token in an RRC message, in which the token is calculated based on the hash value representing the data.

8 Claims, 15 Drawing Sheets

Related U.S. Application Data

(60) Provisional application No. 62/630,867, filed on Feb. 15, 2018.

(58) Field of Classification Search
USPC .......................................................... 726/26
See application file for complete search history.

(56) References Cited

U.S. PATENT DOCUMENTS

| | | | |
|---|---|---|---|
| 10,582,378 | B2 | 3/2020 | Chen et al. |
| 2007/0297367 | A1* | 12/2007 | Wang .................. H04W 12/106 370/331 |
| 2008/0039096 | A1 | 2/2008 | Forsberg |
| 2016/0345169 | A1 | 11/2016 | Wifvesson |
| 2017/0163607 | A1 | 6/2017 | Skuratovich |
| 2018/0020382 | A1 | 1/2018 | Kim |
| 2018/0227302 | A1* | 8/2018 | Lee ..................... H04W 12/069 |
| 2018/0234839 | A1* | 8/2018 | Tenny ............... H04W 36/0033 |
| 2019/0268759 | A1* | 8/2019 | Targali .................. H04W 12/71 |
| 2021/0306256 | A1* | 9/2021 | Ward ...................... H04L 45/04 |
| 2022/0159465 | A1* | 5/2022 | Shrestha ........... H04W 12/0431 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 14)", Technical Specification, 3GPP TS 36.331 V14.4.0. Sep. 2017, pp. 1-753, 3GPP, France.

Ericsson , Evaluation for early data transmissions, 3GPP TSG-RAN WG2 #100 ,R2-1713058, Reno, Nevada, USA, Nov. 27-Dec. 1, 2017.

Ericsson, "UL MIMO for non-codebook based transmission," 3GPP TSG-RAN WG1 #90, R1-1714272; Prague, Czech Republic, Aug. 21-25, 2017, 4 pages.

Huawei, HISilicon , Introduction of further NB-IOT enhancements in TS 36.331, 3GPP TSG-RAN2 Meeting #100, R2-1714272 , Reno, US, Nov. 27-Dec. 1, 2017.

Qualcomm Incorporated. "Early data transmission." 3GPP TSG RAN WG1 Meeting #90 R1-1712804, Aug. 2017, pp. 1-17, www.3gpp.org/ftp/TSG_RAN/WG1_RL1/TSGR1_90/Docs/R1-1712804.zip. Retrieved Oct. 26, 2021.

Wikipedia, Hash function, https://en.wikipedia.org/wiki/Hash_function, Jul. 28, 2019, taken on Apr. 25, 2022.

3GPP TS 33.401 V15.1.0, 3rd Generation Partnership Project: Technical Specification Group Services and System Aspects; 3GPP System Architecture Evolution (SAE); Security architecture (Release 15), 3GPP TS 33.401 V15.1.0 (Sep. 2017).

3GPP TS 36.300 V14.4.0 Sep. 2017, 3rd Generation Partnership Project, Technical Specification Group Radio Access Network; Evolved Universal Terrestrial Radio Access (E-UTRA) and Evolved Universal Terrestrial Radio Access Network (E-UTRAN); Radio Link control (RLC) protocol specification (Release 14) 3GPP TS 36.300 V14.4.0 (Sep. 2017)

3GPP TS 36.322 V14.1.0, 3rd Generation Partnership Project; Technical Specification Group Radio Access Network; Evolved Universal Terrestrial Radio Access (E-UTRA); Radio Link Control (RLC) protocol specification (Release 14), 3GPP TS 36.322 V14.1.0 (Sep. 2017).

3GPP, "3rd Generation Partnership Project; Technical Specification Group Radio Access Network; Evolved Universal Terrestrial Radio Access (E-UTRA): Medium Access Control (MAC) protocol specification (Release 14)", TS 36.321 V14.4.0 (Sep. 2017).

* cited by examiner

METHOD FOR IMPROVING DATA TRANSMISSION SECURITY

PRIORITY

This application is a continuation of U.S. application Ser. No. 16/963,239 filed on Jul. 19, 2020, now U.S. Pat. No. 11,563,749, which is a 371 of International Application No. PCT/IB2019/051199 filed Feb. 14, 2019, and claims benefit of U.S. Provisional Application No. 62/630,867 filed Feb. 15, 2018 the disclosure of which is fully incorporated herein by reference.

TECHNICAL FIELD

Particular embodiments relate to the field of data transmission security; and more specifically, to methods, apparatus and systems for improving data transmission security in a random access procedure.

BACKGROUND

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories, as in Cat-M1, Cat-M2, supporting reduced bandwidth of up to 6 and 24 physical resource blocks (PRBs), and Narrowband IoT (NB-IoT) UEs providing a new radio interface, with UE categories Cat-NB1 and Cat-NB2.

The LTE enhancements introduced in 3GPP Release 13, 14, and 15 for MTC would be referred as "eMTC", including but not limited to support for bandwidth limited UEs, Cat-M1/M2, and support for coverage enhancements. This is to separate discussions from NB-IoT used for any Release, although the supported features are similar on a general level.

For both eMTC and NB-IoT, Cellular IoT EPS User Plane optimization and Cellular IoT EPS Control Plane optimization signaling reductions were also introduced in Release 13. The former, here referred to as UP-solution, allows the UE to resume a previously stored RRC connection, thus also known as RRC Suspend/Resume. The latter, here referred to as CP-solution, allows the transmission of user-plane data over non-access stratum, i.e. DoNAS.

For 3GPP Release 15, new work items (WIs) for Even further enhanced MTC for LTE (LTE_eMTC4) and Further NB-IoT enhancements (NB_IOTenh2) target eMTC and NB-IoT enhancements, respectively. The new WIs for LTE_eMTC4 here is referred to as WI_eMTC, and the new WIs for NB_IOTenh2 here is referred as WI_NBIOT. In both of these, one of the goals for a WI is to reduce UE power consumption and latency through introducing possibilities to send data as early as possible during the Random Access (RA) procedure.

WI_eMTC supports early data transmission and evaluates power consumption, latency gain, and specifies necessary support for downlink (DL)/uplink (UL) data transmission on a dedicated resource during the RA procedure, e.g. after physical random access channel (PRACH) transmission and before the RRC connection setup is completed, at least in the RRC Suspend/Resume case.

WI_NBIOT evaluates power consumption, latency gain, and specifies necessary support for DL/UL data transmission on a dedicated resource during the RA procedure, after NPRACH transmission and before the RRC connection setup is completed.

In recent RAN2 meetings, such as RAN2 #99, RAN2 #99bis, and RAN2 #100, many contributions on early data transmission (EDT) were discussed. A set of the agreements is to support early UL data transmission in Msg3 for Release 13 UP solution.

The set of the agreements is summarized as follows: (1) Supporting early UL data transmission in Msg3 for control plane and user plane cellular IoT (CIoT) Evolved Packet System (EPS) optimization is intended to be accomplished; (2) For UP solution, signaling radio bearer 0 (SRB0) is used to transmit the RRC message in Msg3; (3) For UP solution, common control channel (CCCH) for RRC message and dedicated traffic channel (DTCH) for UP data are multiplexed in medium access control (MAC) in Msg3; (4) For UP solution, access stratum (AS) security is resumed before transmitting Msg3, and data transmitted in Msg3 is protected by AS security; (5) How to address the padding issue in Msg3 requires a further study; (6) resumeID, shortResumeMAC-I, and resumeCause are included in Msg3 for EDT; (7) None of the parameters currently provided in Msg5 are included in Msg3 for EDT; (8) UE is in RRC_IDLE when transmitting Msg3 for EDT, same as legacy; (9) UE shall perform access barring check before initiating EDT; (10) UE shall restore the UE context, reactivate security, and re-establish or resume all SRBs/data radio bearers (DRBs), wherein the UE shall derive new keys based on the NCC provided in the previous connection, and which message NCC provided in the previous connection and SA3 feedback may require a further study; and (11) Legacy RRCConnectionResumeRequest message is used in Msg3.

Existing solutions for realizing the early data transmission concept have recently been presented in certain previously filed applications as have the security aspects of early data transmission in UP solution.

FIG. 1 illustrates an example contention-based random access (RA) procedure from TS36.300. The messages in the RA procedure are commonly referred to as message 1 (Msg1) through message 4 (Msg4).

In legacy LTE, Msg3 is an early message and with neither confidentially nor integrity protection. In Rel-13 UP solution, Msg3 includes the RRCConnectionResumeRequest (in short ResumeRequest). For Rel-14 and earlier releases, the ResumeRequest is formed at RRC layer with a security token, i.e., shortResumeMAC-I (sRMAC-I) that is used to validate the authenticity of the ResumeRequest. In addition, user data in Rel-13 UP solution is transmitted after the RRC connection resume completion with AS security. More specifically, the earliest time UL data can be transmitted is in Msg5, i.e., uplink (UL) data is multiplexed with the RRC-ConnectionResumeComplete. The transmission of Msg5 is considered from a legitimate UE if the eNB successfully verifies RRCConnectionResumeComplete message in Msg5 based on a 32-bit message authentication code for integrity protection, e.g. MAC-I, which is calculated and checked at the packet data convergence protocol (PDCP) sub-layer. In case of successful verification, the UL data received in Msg5 is forwarded from the eNB to the serving gateway (S-GW).

In UP early data transmission (EDT) solution, the UL data is multiplexed with the ResumeRequest at MAC sub-layer in Msg3. UL data transmission is on dedicated traffic channel (DTCH), which is logical channel, over DRB bearer and thus is ciphered at PDCP sub-layer. Similar to Rel-13 UP solution, the ResumeRequest includes the sRMAC-I to validate its authenticity, i.e., sRMAC-I is intended for the eNB to check whether it is from a legitimate UE. A possible difference between Rel-13 and Rel-15 is the length of sRMAC-I, i.e., extending from 16 bits in Rel-13 to 32 bits in Rel-15.

There currently exist certain challenge(s). In Rel-13 RRC Suspend/Resume solution, the ResumeRequest does not have PDCP support, yet it includes the 16-bit sRMAC-I as a security token to validate the authenticity of the resume request. However, when it comes to early data in Msg3 where UL data is multiplexed with the ResumeRequest, such 16-bit sRMAC-I parameter may be insufficient for the authenticity validation. It is therefore proposed to extend its length to 32 bits.

This security token sRMAC-I is calculated and verified at the RRC layer based on a set of variables including the target Cell ID, the source physical Cell ID, and the C-RNTI used in the source cell. Thus, this does allow the eNB to know if it was produced by a legitimate UE, but does not allow to know if it was sent by a legitimate UE. An attacker may copy the resume request and pretends to be a legitimate UE, i.e., replay attack. The eNB is unable to detect replayed Msg3 by verifying shortResumeMAC-I. An example for replay attack is when the resume request is rejected and the UE is put to idle or being suspended. Since the eNB provides a new resumeID, e.g., in Msg4 in response to the replayed Msg3, when the legitimate UE tries random access again, the UE context no longer exist since its resumeID is obsolete. To further enhance the authenticity of the Resume request, some solutions relate the sRMAC-I to a freshness parameter associated with the target eNB, such as Temporary C-RNTI. Since the Temporary C-RNTI is updated every random access attempt, when a replay of the Resume request is with an obsolete Temporary C-RNTI is attempted, it can be detected by the eNB. In this case, the eNB can avoid forwarding possible fake UL data received in Msg3 to the S-GW.

Another security aspect is possible modifications of user data in Msg3, i.e., Man-in-the-middle (MiM) attack. Attackers may change user data in Msg3, for example, by flipping data bits. In, e.g., LTE and NB-IoT, user data transmission over DRB is ciphered, but not integrity protected, at PDCP sub-layer. Hence, the eNB may not be able to detect a change or an alteration of the payload. Note that the MiM attack on Msg3 is different from that on data transmissions in legacy LTE. In legacy LTE, data transmissions only take place after the eNB has verified that the UE is legitimate one by means of integrity protection. However, since Msg3 with UL data is not integrity protected, both replay and MiM attacks could be performed by the same attacker. Note also that the inclusion of freshness parameter in other scenarios only helps limit rather than prevent replay attacks. As a result, the eNB may forward the faked data to S-GW. To enhance the security for UL data in Msg3, some solutions propose to include UL data in the calculation of sRMAC-I as a way to integrity protect UL data. However, when the UE resumes to another eNB, the verification of sRMAC-I requires the transfer of actual data via X2 interface. This is not efficient considering X2 signaling overhead as well as variable size of X2 message. In addition, how to handle the inclusion of data in calculation of sRMAC-I when building Msg3 in different scenarios remains to be addressed.

SUMMARY

To address the foregoing problems with existing solutions, disclosed are methods, a user equipment (UE), and a network node, to enhance data transmission security for early uplink data in an RRC message, e.g. Msg3, to support immediate forwarding of UL user data received at a target network node in Msg3 toward a gateway with an appropriate security level with respect to legacy LTE operations. The present disclosure implements a solution to minimize signaling overhead incurred in the UE context fetching between a source network node and the target network node by including a fixed-size hash value to represent uplink data in Msg3.

Several embodiments are elaborated in this disclosure. According to a first embodiment of a method for improving data transmission security at a user equipment, the method comprises receiving, from a first network node, a connection release message including a current integrity key and instructions for computing a hash value for data to be included in a connection request message. The method further comprises computing, at a user equipment, the hash value based on the instructions included in the connection release message. The method additionally comprises calculating, at the user equipment, a token based on the hash value and an integrity key. The method yet further comprises sending, to a second network node, the connection request message including the token.

In one embodiment, the integrity key used to calculate the token is a new integrity key derived from the current integrity key. In another embodiment, the integrity key used to calculate the token is the current integrity key used in a previous connection to the first network node.

In one embodiment, the method further comprises receiving instructions for computing the hash value from the second network node.

In one embodiment, the hash value is computed by a radio resource control (RRC) layer, and the data is provided by a lower layer to the RRC layer. In another embodiment, the hash value is computed by a lower layer and provided to a RRC layer.

According to a second embodiment of a method for improving data transmission security at a network node, the method comprises sending, from a first network node to a user equipment, a preamble message after the user equipment is released by a second network node from a previous connection. The method further comprises receiving, from a user equipment at the first network node, a connection request message including a token calculated based a hash value and an integrity key, wherein the hash value represents data included in the connection request message. The method additionally comprises verifying, at the first network node, the token included in the connection request message by computing the hash value. The method yet further comprises forwarding, from the first network node to a gateway, the data in response to verifying the token.

In one embodiment, the integrity key is a new integrity key derived at the user equipment. In another embodiment, the integrity key is a current integrity key which is used in the previous connection to the second network node.

In one embodiment, verifying token comprises determining, at the first network node, that the token uses the current integrity key; forwarding, to the second network node, the token to verify the token; and receiving, at the first network node, a verified token. In another embodiment, verifying token comprises determining, at the first network node, that the hash value is computed before the data is ciphered; forwarding, to the second network node, a ciphered data for deciphering; receiving, from the second network node at the first network node, a deciphered data; and verifying, at the first network node, the token with the deciphered data. In yet another embodiment, verifying token comprises determining, at the first network node, that the hash value is computed after the data is ciphered; forwarding, to the second network node, the hash value for verifying the token; and receiving, from the second network node at the first network node, a verified token.

In one embodiment, the hash value is computed by a radio resource control (RRC) layer, and the data is provided by a lower layer to the RRC layer. In another embodiment, the hash value is computed by a lower layer and provided to a RRC layer.

According to another embodiment, a user equipment for improving data transmission security comprises at least one processing circuitry and at least one storage that stores processor-executable instructions, when executed by the processing circuitry, causes a user equipment to receive, from a first network node, a connection release message including a current integrity key and instructions for computing a hash value for data to be included in a connection request message; compute the hash value based on the instructions included in the connection release message; calculate a token based on the hash value; and send, to a second network node, the connection request message including the token.

According to yet another embodiment, a network node for improving data transmission security comprises at least one processing circuitry, and at least one storage that stores processor-executable instructions, when executed by the processing circuitry, causes a network node to send, to a user equipment, a preamble message after the user equipment is released by a second network node from a previous connection; receive, from a user equipment, a connection request message including a token calculated based a hash value and an integrity key, wherein the hash value represents data included in the connection request message; verify the token included in the connection request message by computing the hash value; and forward, to a gateway, the data in response to verifying the token.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may provide a secure, efficient way to improve the security for uplink data in Msg3 by including a hash value representing uplink data into a calculation of a token for Msg3. Furthermore, utilizing a fixed-size hash value to present uplink included in Msg3 may minimize a signaling overhead for fetching UE context between the source network node and the target network node.

The present embodiments to enhance the security of an RRC message may be described with respect to LTE and NB-IoT, but may be applied also to other systems and/or technologies, such as 5G/NR.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

In 3GPP radio access networks, when a user equipment is being released by a source network node and tries to connect to another network node in a random access procedure, a replay attack or a man-in-the-middle attack may modify uplink data in Msg3 since the uplink data is not integrity protected. Particular embodiments of the present disclosure propose a method to input a hash code of uplink data to be in a resume request message, e.g. Msg3, to the calculation of a token, e.g. sRMAC-I, in the RRCConnectionResumeRequest, so that the uplink data is integrity protected in addition to being ciphered thus allowing the eNB to detect possible MiM attacks to avoid forwarding bad data to a gateway, e.g. S-GW. Particular embodiments of the present disclosure further propose a method to compute a hash value to represent the uplink, so that the hash value may reduce a signaling overhead since the hash value is fixed, limited size.

In detail, the hash value in particular embodiments helps minimize X2 signaling overhead incurred in UE context fetching between target eNB and source eNB for verification of sRMAC-I. The fixed size of hash value also makes the size of RRC message via X2 interface deterministic rather than being variable if the actual data is used. Furthermore, hashing uplink data also improves the integrity of transmitted data. For example, particular embodiments in the present disclosure may provide appropriate levels of protection for uplink data in Msg3 when adopting early data transmission concept. Particular embodiments enable the target eNB to immediately forward uplink data received in Msg3 to S-GW. Particular embodiments are beneficial to a performance in the network given that the uplink data to be included in legacy Msg3 has variable size, and especially in the situations where the UL grant for Msg3 is not deterministic. In addition, the proposed solution ensures backward compatibility.

Some of the embodiments contemplated herein will now be described more fully with reference to the accompanying drawings. Other embodiments, however, are contained within the scope of the subject matter disclosed herein; the disclosed subject matter should not be construed as limited to only the embodiments set forth herein; rather, these embodiments are provided by way of example to convey the scope of the subject matter to those skilled in the art.

Figure 1:
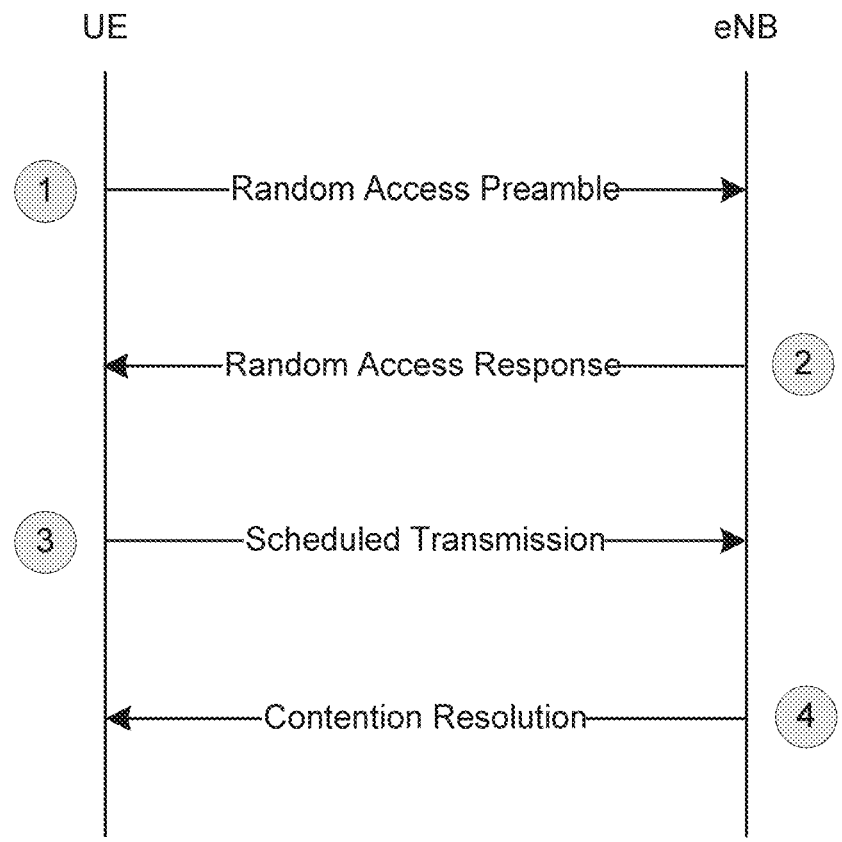
FIG. 1 illustrates an example contention-based random access procedure.
Figure 2:
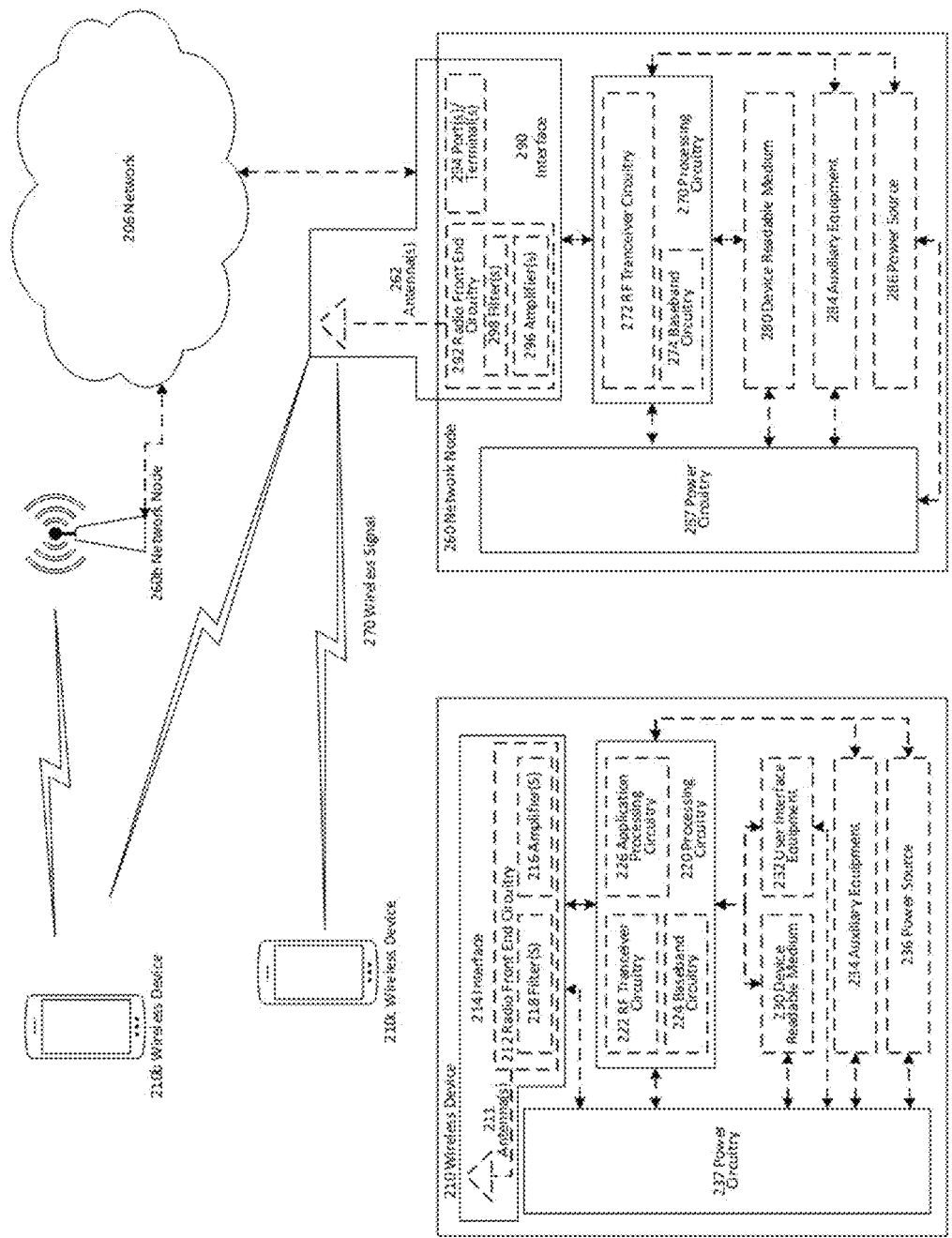
FIG. 2 illustrates an example wireless network, according to certain embodiments.

FIG. 2 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b, and wireless devices (WDs) 210, 210b, and 210c. In practice, a wireless network may further include any additional elements suitable to support communication between wireless devices or between a wireless device and another communication device, such as a landline telephone, a service provider, or any other network node or end device. Of the illustrated components, network node 260 and wireless device (WD) 210 are depicted with additional detail. In certain embodiments, the network node 260 may be a source eNB or a target eNB depicted in FIG. 3. In certain embodiments, the network node may be a network node which is further depicted in FIG. 15. In some embodiments, the network node 260 may be a base station, such as gNB. In certain embodiments, the wireless device 210 may be a user equipment, which is further illustrated in FIG. 14. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 288, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination. In particular embodiments, the processing circuitry 270 of the network node 260 may perform the methods, which are further illustrated in FIG. 13.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260 but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signaling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 210 may be a user equipment which is further depicted in FIG. 14. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein. In particular embodiments, the processing circuitry 220 of the wireless device 210 may perform the method which is further illustrated in FIG. 12.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionalities described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

Figure 3:
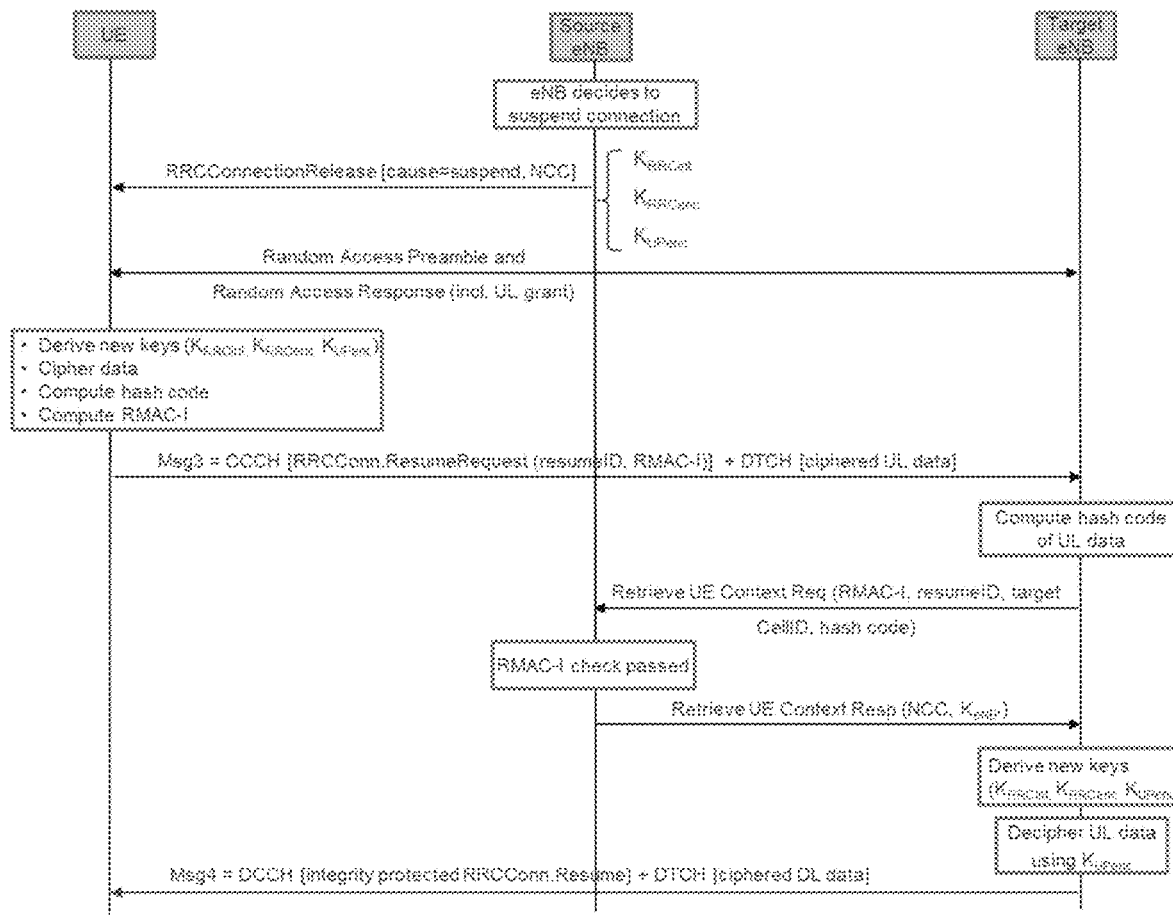
FIG. 3 illustrates an example random access procedure including hash code of uplink data in a token calculation, according to certain embodiments.

FIG. 3 illustrates an example random access procedure including hash code of uplink data in a token calculation, in accordance with certain embodiment. In some embodiments, a calculation of sRMAC-I in the RRCConnectionResumeRequest is based on a hash code of uplink data to be MAC multiplexed with the RRCConnectionResumeRequest in Msg3. In some embodiments, the hash code may be referred as hash value, digests, or hashes. In some embodiments, the hash code may also be applied to any other suitable tokens, such as RMAC-I. The way of calculating of sRMAC-I is to have uplink data integrity protected to allow eNB to detect possible modification of data part in Msg3, so that forwarding uplink data received in Msg3 from the eNB to S-GW may be done immediately.

In one embodiment, the inclusion of hash code of uplink data in the sRMAC calculation may be done irrespective of where the verification of sRMAC-I is performed, i.e., at the source eNB or the target eNB.

In one embodiment, the inclusion of hash code of uplink data in the sRMAC calculation may be done using a new integrity key for the sRMAC-I calculation. In another embodiment, the inclusion of hash code of uplink data in the sRMAC calculation may be done using a current integrity key, i.e., the current integrity key used in a previous connection. If the current integrity key is used, the verification of sRMAC-I may need to be done at the source eNB since the old key may not be available in the target eNB.

In one embodiment, details to enable hashing functionality, such as hash algorithm or function to produce, may be decided by eNB and informed to the UE via a UE-specific signaling. In some embodiments, the details may comprise the hash code and length of hash code, e.g., 16 bits.

In one embodiment, the hash code may be computed before uplink data is ciphered, i.e. over clear text data. For a verification of the sRMAC-I, user data is then deciphered before computing the hash code. When the target eNB which receives Msg3 does not have the ciphering key yet, the target eNB is not able to compute the hash code immediately since it cannot decipher the data. It then needs to transfer ciphered uplink data to the source eNB together with details for the hash code, such as, a hash function, if not known to the source eNB, for computation of the hash code. After the hash code has been decrypted before the sRMAC-I may be verified. In some embodiments, the uplink data may comprise user data.

In another embodiment, the hash code may be computed after uplink data is ciphered. In this case, when the target eNB receives Msg3, it may compute the hash code without need for the ciphering key to decipher data. If verification of sRMAC-I would take place at the source eNB, the target eNB then transfers only the fixed-size hash code to the source eNB for the verification of sRMAC-I. Thus, there is no need to transfer whole data nor the details for hash functions to the source eNB.

In some embodiments, an inter-layer interaction between the RRC layer and lower layers is needed in the process of building an RRC message with respect to the calculation and verification of sRMAC-I. This is because the RRC sub-layer calculates the parameter, whereas uplink data is not available at this RRC sub-layer. In one embodiment the hash code may be computed by the RRC layer, in which case lower layers, e.g., PDCP, radio link control (RLC), or MAC, provides the RRC layer with the unciphered or ciphered data for the computation of the hash code to be included in sRMAC-I. The unciphered or ciphered data may be provided by the lower layers upon request by RRC. In another embodiment, the hash code may be computed by lower layers, e.g., PDCP, RLC or MAC, and provided to the RRC layer for the calculation of the sRMAC-I. The hash code may be provided by the lower layers upon request by RRC.

In case of subsequent of Msg3 transmissions, i.e., attempts to transmit the content of Msg3 buffer, if the rebuilding of the DTCH service data unit (SDU) part in Msg3 is needed, the recalculation of sRMAC-I is also needed. In one embodiment, the RRC layer recalculates sRMAC-I based on a new DTCH SDU to be included in Msg3 whenever respective changes to data part are needed. In one embodiment, RRC provides a new or updated RRC protocol data unit (PDU) with the recalculated sRMAC-I to lower layers. In another embodiment, RRC provides the recalculated sRMAC-I to lower layers, e.g., to the MAC layer, which inserts the new value and replaces the old sRMAC-I at the relevant location in the PDU, e.g., MAC PDU, updating only the relevant bits and/or section of the message. In another embodiment, the MAC layer may re-compute sRMAC-I and inserts the new value into its respective location in the Msg3 MAC PDU, i.e., updating only the relevant bits and/or section of the message.

In some embodiments, the hash code may be a function of one or more of a data unit, and information associated with the data unit or a data unit. For example, H=function(data) or H=function(data, information). In one embodiment, information associated with the data unit may, instead of being input to the hash function, be passed along with the hash code as input to the calculation of the sRMAC-I. The information associated with a data unit or the data unit may comprise control information, such as MAC sub-header, logical channel identifier, radio bearer identifier, and length of data unit.

In some embodiments, a data unit, e.g., RLC PDU or MAC SDU, over which the hash code is computed, comprises a portion of uplink data available for transmission or a portion of a user data packet, e.g., PDCP SDU or PDCP PDU or RLC SDU or IP packet.

An example hash function [Hash Function] is described in Annex I.2 of TS 33.401 [TS33.401] as follow. Regarding a hash function at mobility management entity (MME) and a UE, $HASH_{MME}$ and $HASH_{UE}$, when the MME and UE may derive $HASH_{MME}$ and $HASH_{UE}$ respectively, using the following parameters as input to the KDF given in TS 33.220 [8], such as S=Unprotected ATTACH Request or tracking area update (TAU) Request message, and Key=256-bit string of all 0s. Note that the order of packing the input, S, to hash algorithm is the same as the order of packing the uplink non-access stratum (NAS) message to the MME. Also note that $HASH_{MME}$ or $HASH_{UE}$ are the 64 least significant bits of the 256 bits of a key derivation function (KDF) output.

Figure 4:
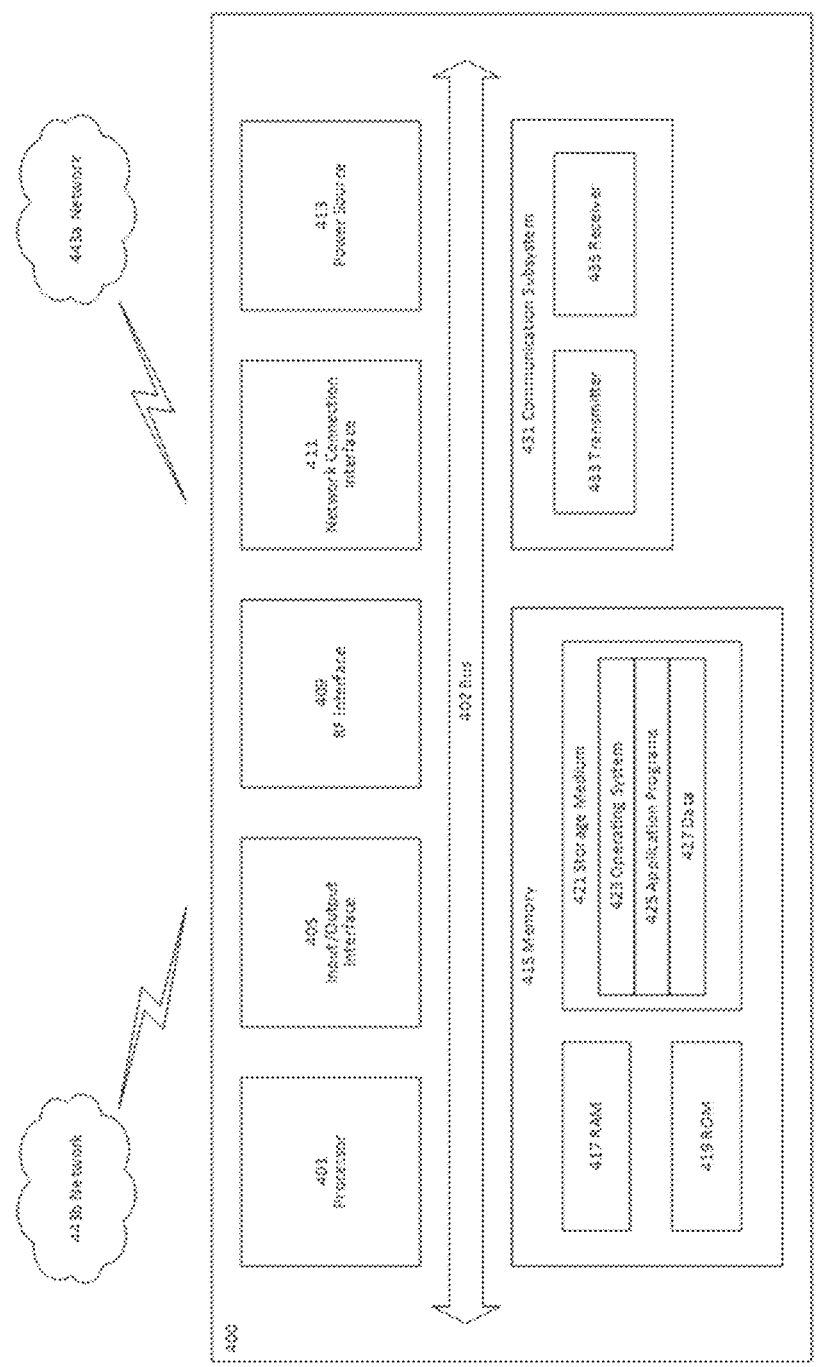
FIG. 4 illustrates an example user equipment, according to certain embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the 3rd Generation Partnership Project (3GPP), including a NB-IoT UE, a MTC UE, and/or an enhanced MTC (eMTC) UE. UE 400, as illustrated in FIG. 4, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 400 may be a user equipment which is further depicted in FIG. 14. As mentioned previously, the term WD and UE may be used interchangeable. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer. In certain embodiment, processing circuitry 401 may perform the method which is further illustrated in FIG. 13.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
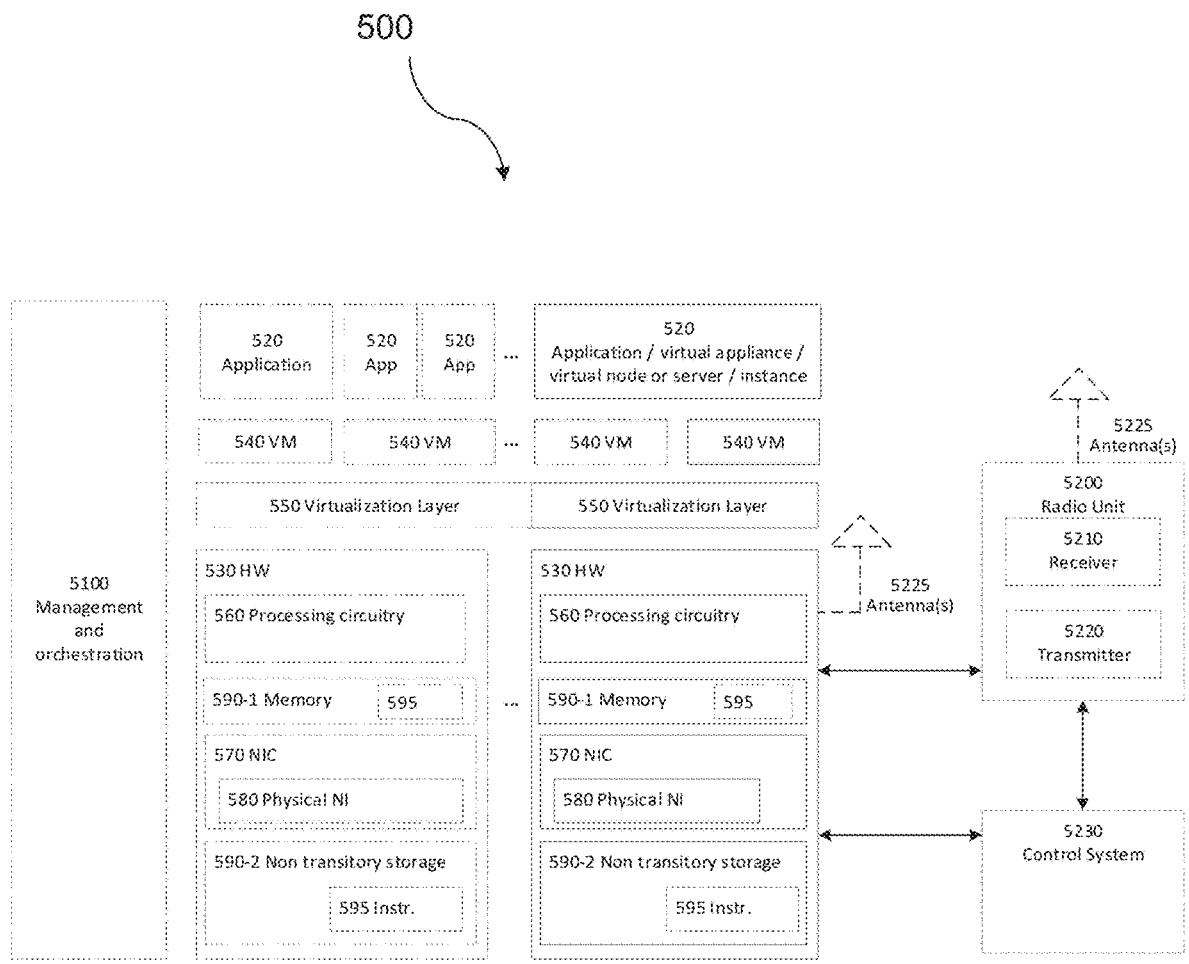
FIG. 5 illustrates an example virtualization environment, according to certain embodiments.

FIG. 5 illustrates an example virtualization environment, according to certain embodiments. FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signaling can be affected with the use of control system 5230 which may alternatively be used for communication between the hardware nodes 530 and radio units 5200.

Figure 6:
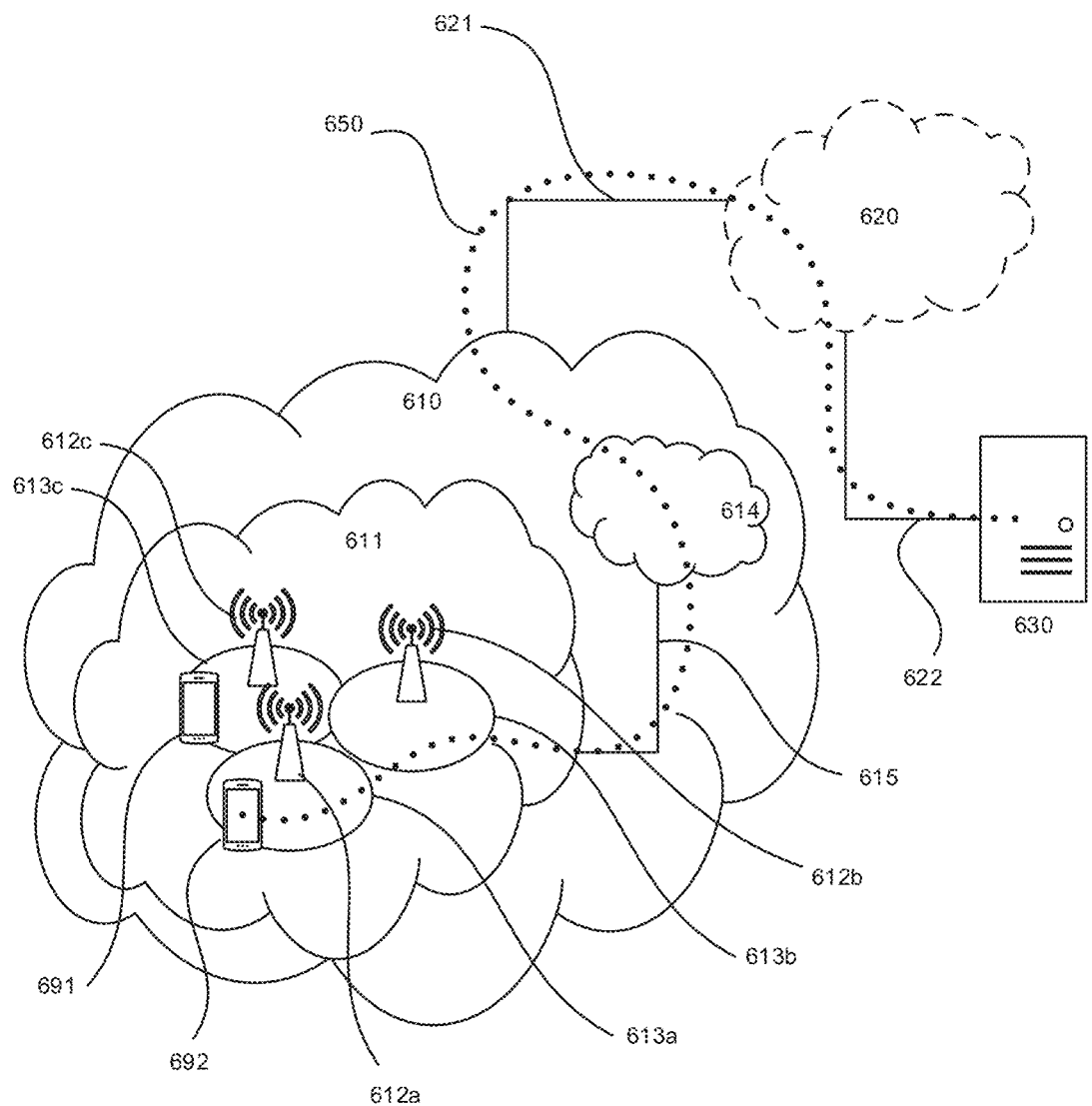
FIG. 6 illustrates an example telecommunication network connected via an intermediate network to a host computer, according to certain embodiments.

FIG. 6 illustrates an example telecommunication network connected via an intermediate network to a host computer, according to certain embodiments. With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612. In certain embodiments, the plurality of UEs 691, 692 may be the user equipment as described with respect to FIG. 14.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more subnetworks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 7:
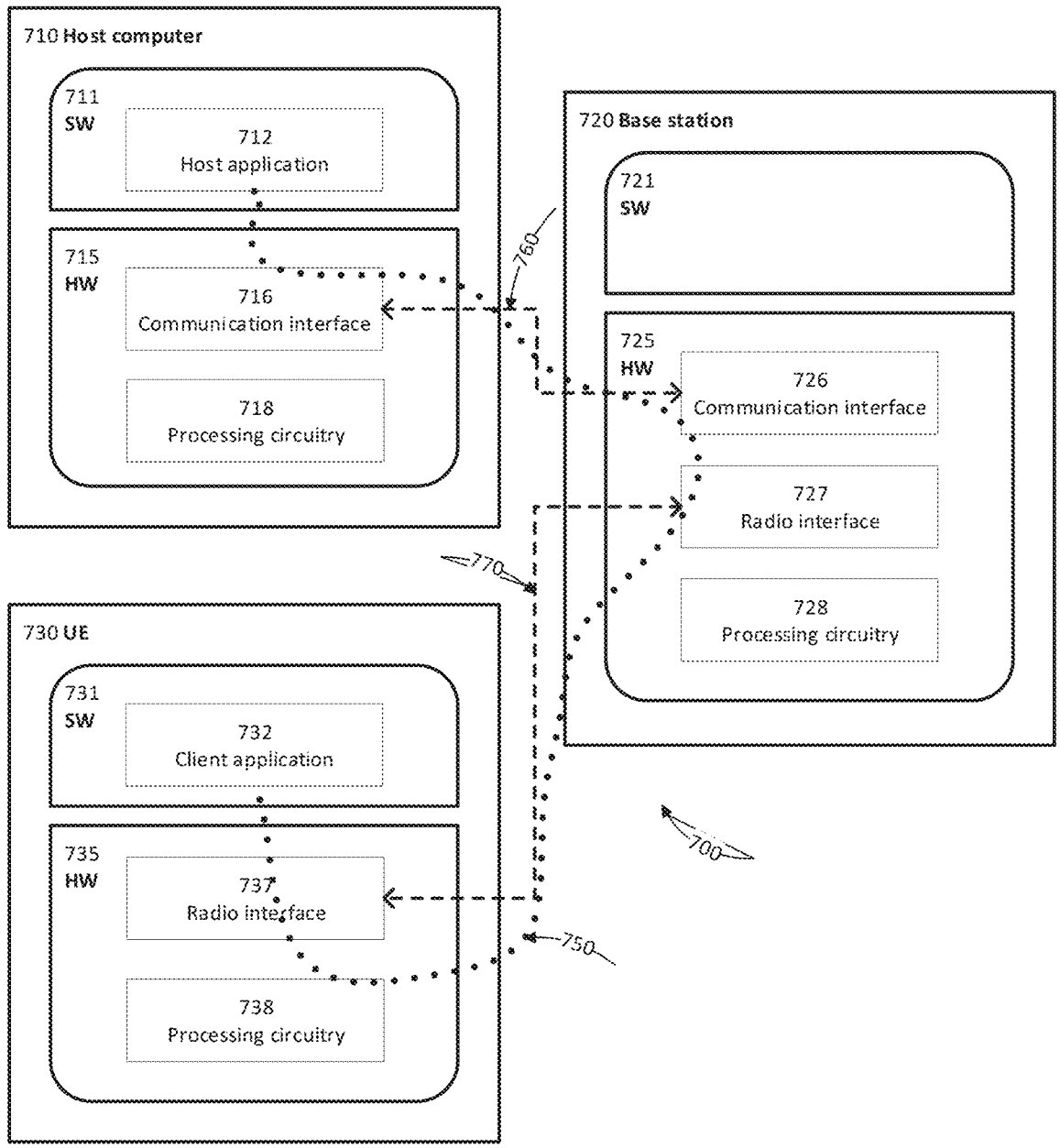
FIG. 7 illustrates an example host computer communicating via a base station with a user equipment over a partially wireless connection, according to certain embodiments.

FIG. 7 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. In certain embodiments, the base station 720 may be a network node as described with respect to FIG. 15. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. In certain embodiments, the UE 730 may be the user equipment as described with respect to FIG. 15. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
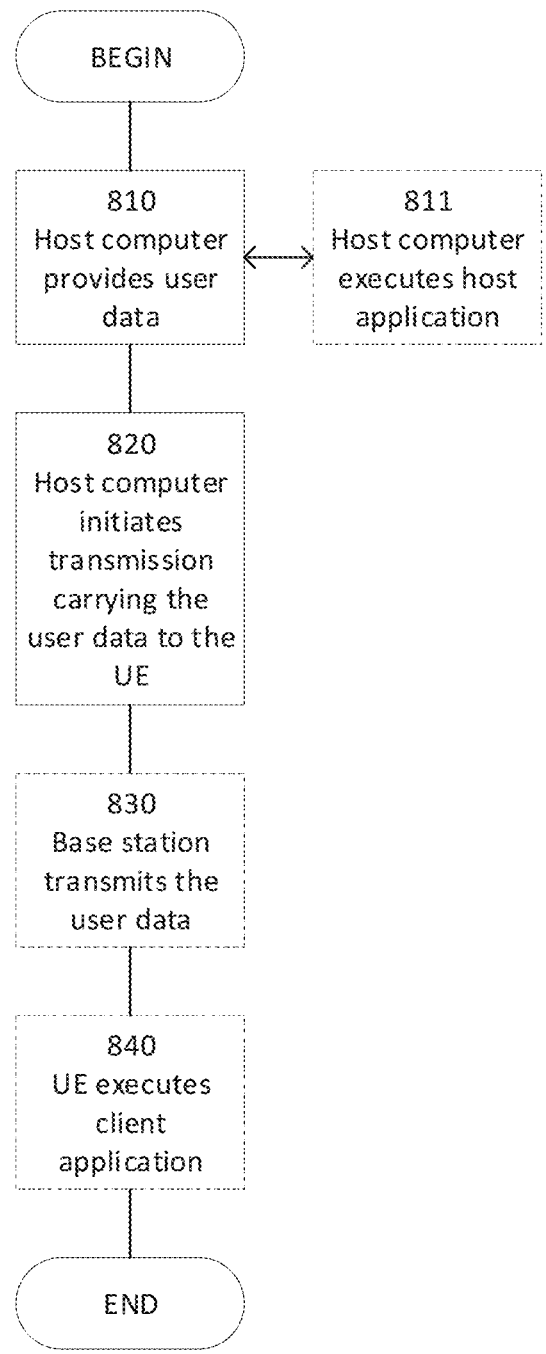
FIG. 8 illustrates an example method implemented in a communication system including a host computer, a base station and a user equipment, according to certain embodiments.

FIG. 8 illustrates an example method implemented in a communication system including a host computer, a base station and a user equipment, according to certain embodiments in accordance with some embodiments. More specifically, FIG. 8 is a flowchart illustrating a method implemented in a communication system, in accordance with one embodiment. The communication system includes a host computer, a base station and a UE which may be a user equipment described with reference to FIG. 14. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
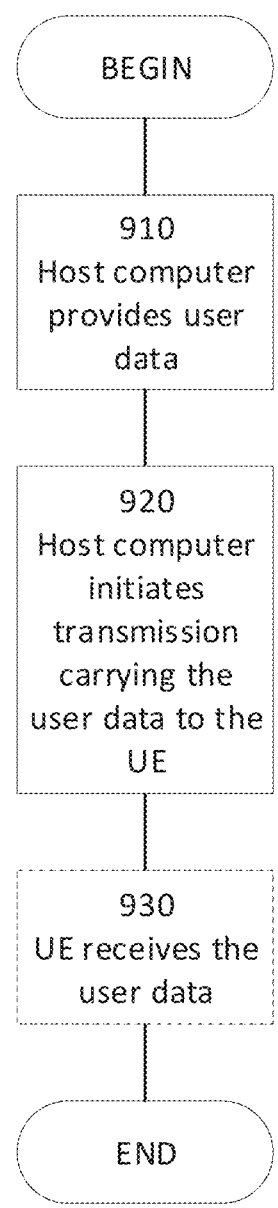
FIG. 9 illustrates another example method implemented in a communication system including a host computer, a base station and a user equipment, according to certain embodiments.

FIG. 9 illustrates an example method implemented in a communication system including a host computer, a base station and a user equipment, in accordance with some embodiments. More specifically, FIG. 9 is a flowchart illustrating a method implemented in a communication system, in accordance with one embodiment. The communication system includes a host computer, a base station and a UE which may be a user equipment described with reference to FIG. 14. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
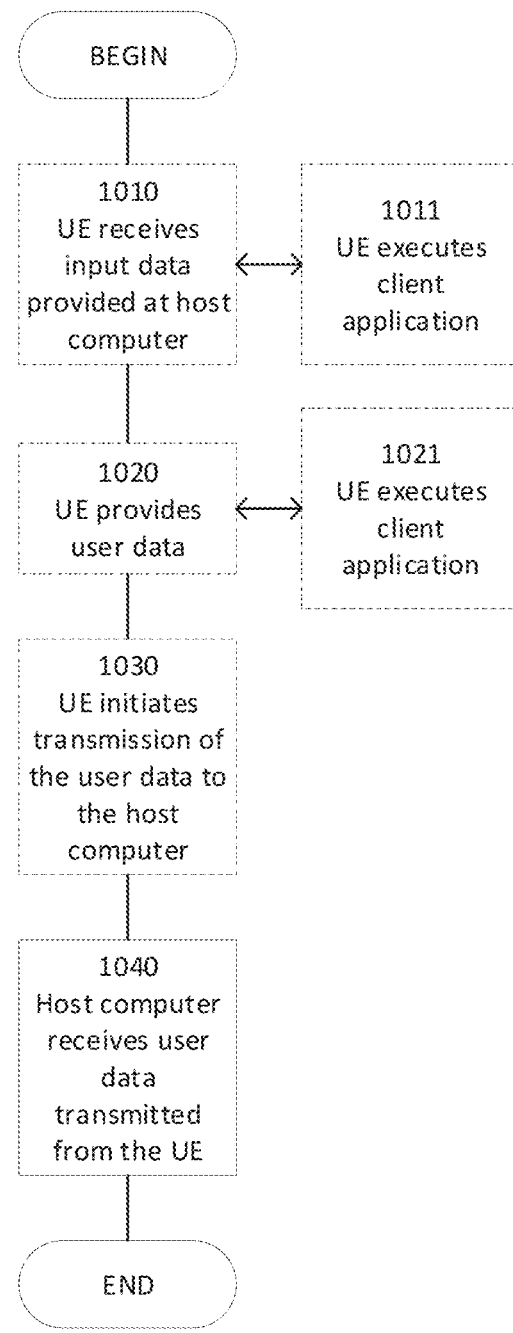
FIG. 10 illustrates another further example method implemented in a communication system including a host computer, a base station and a user equipment, according to certain embodiments.

FIG. 10 illustrates another further example method implemented in a communication system including a host computer, a base station and a user equipment, in accordance with some embodiments. More specifically, FIG. 10 is a flowchart illustrating a method implemented in a communication system, in accordance with one embodiment. The communication system includes a host computer, a base station and a UE which may be a user equipment described with reference to FIG. 14. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 11:
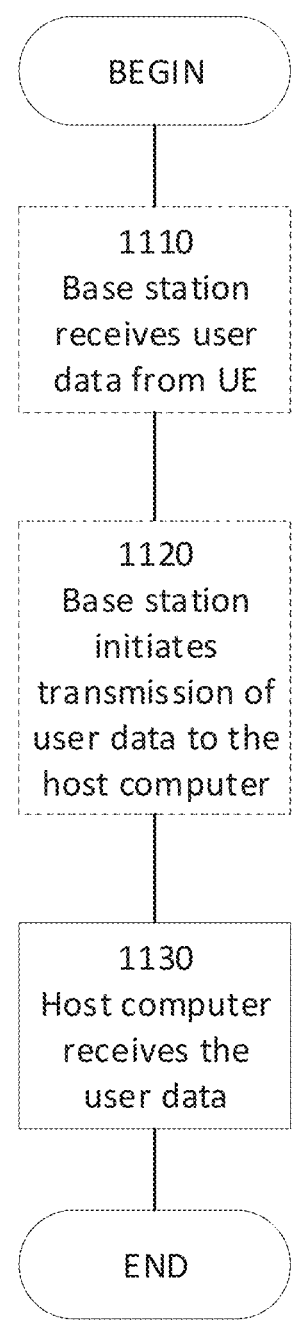
FIG. 11 illustrates another yet example method implemented in a communication system including a host computer, a base station and a user equipment, according to certain embodiments.

FIG. 11 illustrates another example method implemented in a communication system including a host computer, a base station and a user equipment, in accordance with some embodiments. More specifically, FIG. 11 is a flowchart illustrating a method implemented in a communication system, in accordance with one embodiment. The communication system includes a host computer, a base station and a UE which may be a user equipment described with reference to FIG. 14. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
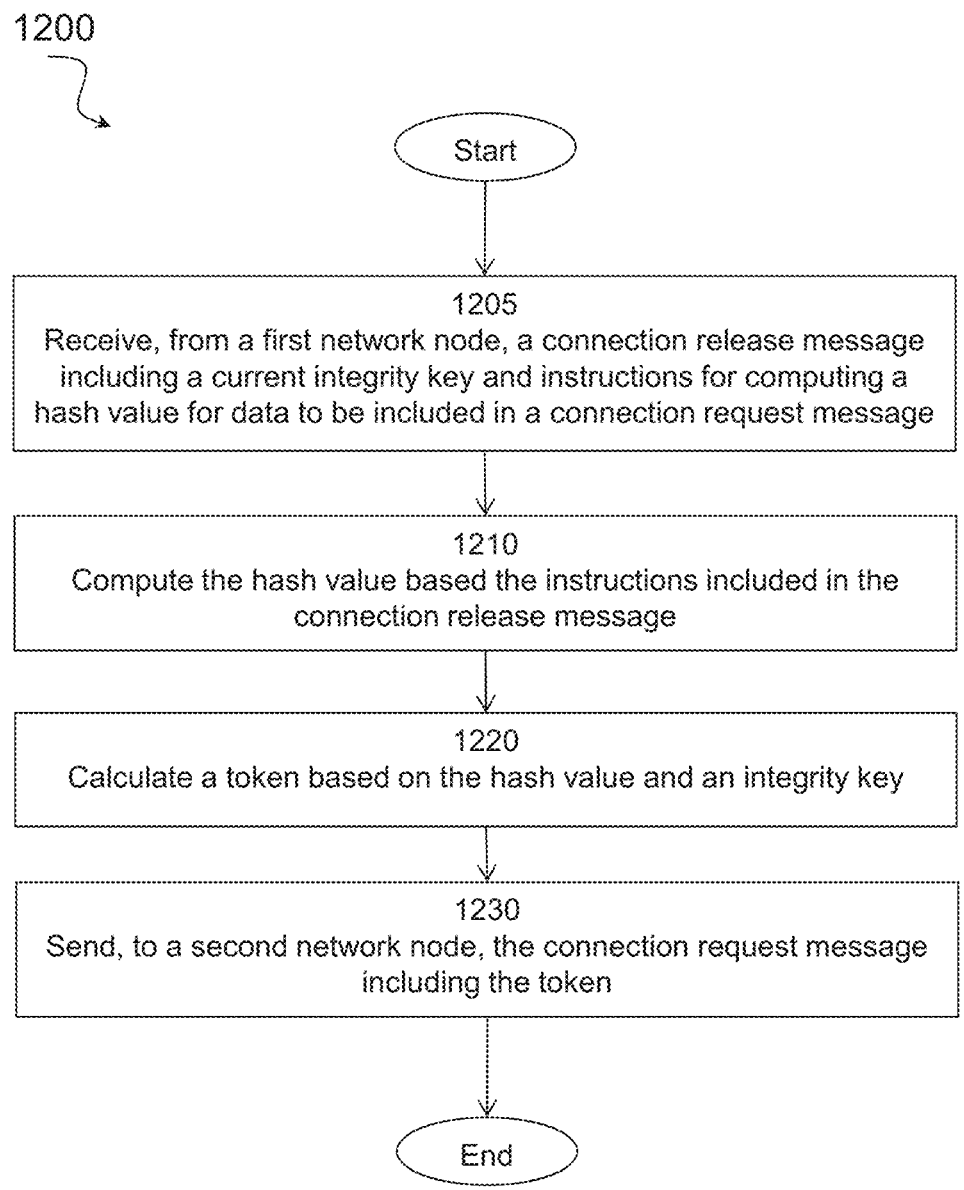
FIG. 12 illustrates a flow diagram of an example method, in accordance with certain embodiments.

FIG. 12 is a flow diagram of an example method, in accordance with certain embodiments. The method may be performed by a UE or a WD. Method 1200 begins at step 1205 with receiving, from a first network node, a connection release message including a current integrity key and instructions for computing a hash value for data to be included in a connection request message. The user equipment may be the wireless device depicted in FIG. 2 or the user equipment shown in FIGS. 3 and 4. In some embodiments, the first network node may be a source network node. In some embodiments, the method 1200 further receives instructions for computing the hash value from a second network node. In some embodiments, the second network node may be a target network node.

At step 1210, the method 1200 computes the hash value based the instructions included in the connection release message. In some embodiments, the hash value may be computed by a radio resource control (RRC) layer, and the data is provided by a lower layer to the RRC layer. In some embodiments, the hash value may be computed by a lower layer and provided to a RRC layer.

At step 1220, the method 1200 calculates a token based on the hash value and an integrity. In some embodiments, the integrity key used to calculate the token may be a new integrity key derived from the current integrity key. In some embodiments, the integrity key used to calculate the token may be the current integrity key used in a previous connection to the first network node.

At step 1230, the method 1200 sends, to the second network node, the connection request message including the token.

Figure 13:
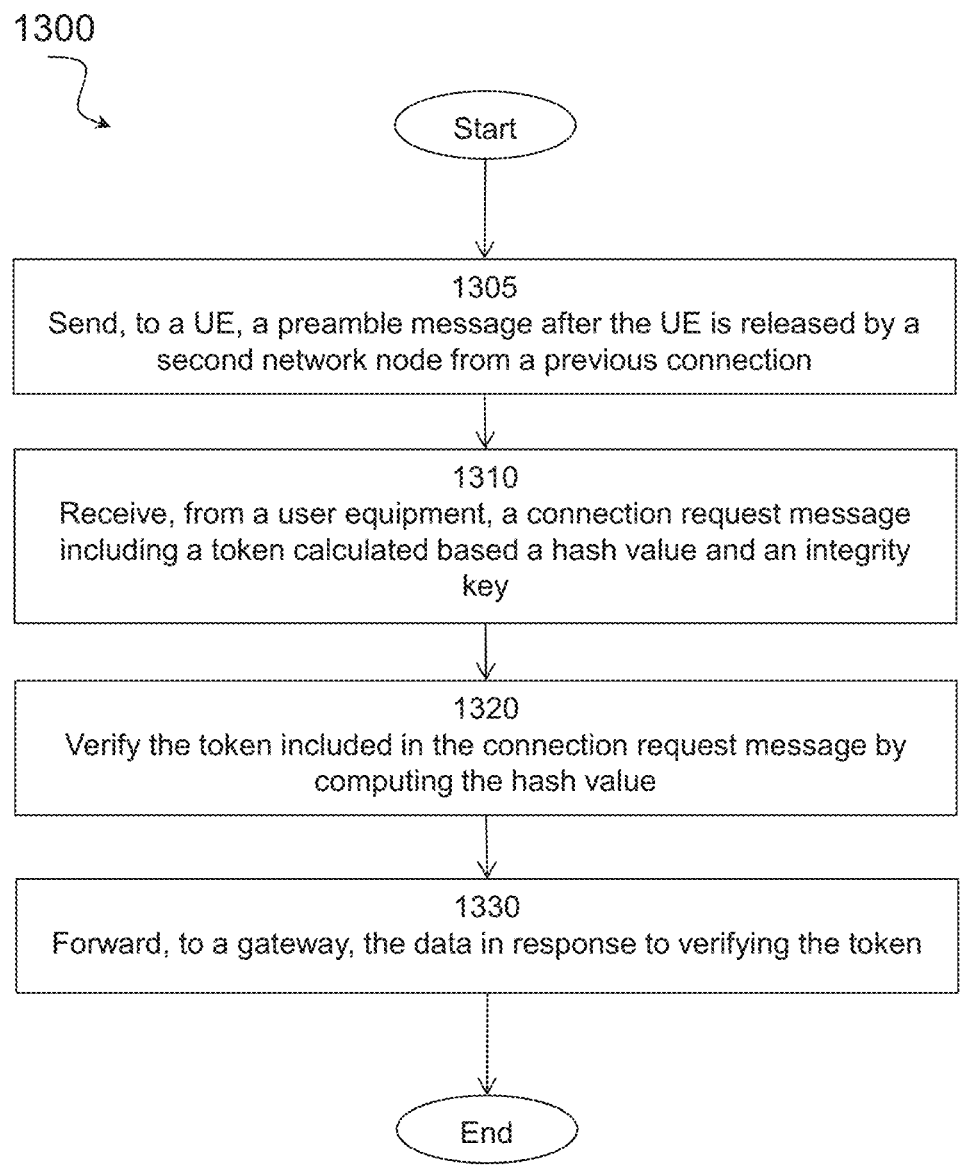
FIG. 13 illustrates a flow diagram of another example method, in accordance with certain embodiments.

FIG. 13 is a flow diagram of another example method, in accordance with certain embodiments. The method may be performed by a network node. The network node may be the network node depicted in FIGS. 2 and 3. Method 1300 begins at step 1305 with sending, from a first network node to a UE, a preamble message after the UE is being released by a second network node from a previous connection. In some embodiments, the first network node may be a target network node, and the second network node may be a source network node.

At step 1310, the method 1300 receives, from the UE, a connection request message including a token calculated based a hash value and an integrity key. In some embodiments, the hash value may be computed by a radio resource control (RRC) layer, and the data is provided by a lower layer to the RRC layer. In some embodiments, the hash value may be computed by a lower layer and provided to a RRC layer. In some embodiments, the integrity key used to calculate the token may be a new integrity key derived from the current integrity key. In some embodiments, the integrity key used to calculate the token may be the current integrity key used in a previous connection to the first network node.

At step 1320, the method 1300 verifies the token included in the connection request message by computing the hash value. In some embodiments, verifying token comprises determining, at the first network node, that the token uses the current integrity key; forwarding, to the second network node, the token to verify the token; and receiving, at the first network node, a verified token. In some embodiments, verifying token comprises determining, at the first network node, that the hash value is computed before the data is ciphered; forwarding, to the second network node, a ciphered data for deciphering; receiving, from the second network node at the first network node, a deciphered data; and verifying, at the first network node, the token with the deciphered data. In some embodiments, verifying token comprises determining, at the first network node, that the hash value is computed after the data is ciphered; forwarding, to the second network node, the hash value for verifying the token; and receiving, from the second network node at the first network node, a verified token.

At step 1330, the method 1300 forwards, to a gateway, the data in response to verifying the token. In some embodiments, the gateway may be S-GW.

Figure 14:
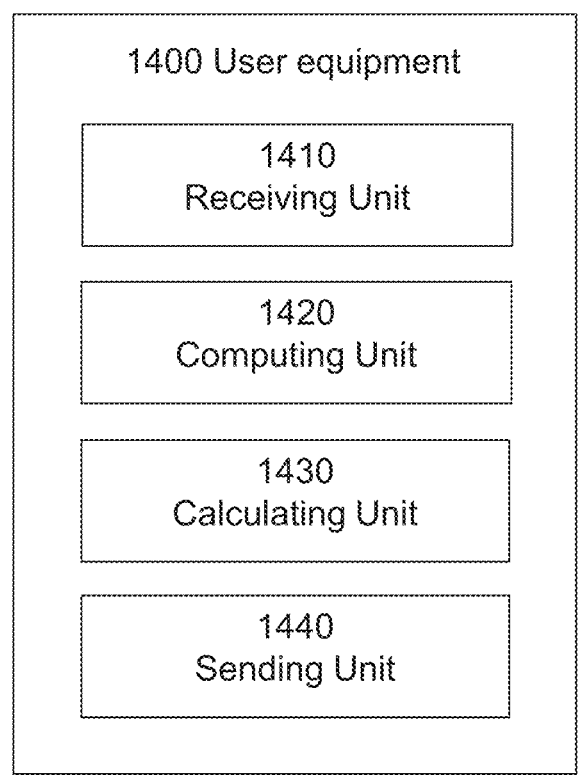
FIG. 14 illustrates a block schematic of an example user equipment, in accordance with certain embodiments.

FIG. 14 is a schematic block diagram of an exemplary user equipment 1400, in accordance with certain embodiments. The user equipment 1400 may be used in a wireless network, e.g. the wireless network 206 shown in FIG. 2. In certain embodiments, the user equipment 1400 may be implemented in a wireless device 210 shown in FIG. 2. The user equipment 1400 is operable to carry out the example method described with reference to FIG. 14 and possibly any other processes or methods disclosed herein. It is also to be understood that the method in FIG. 14 are not necessarily carried out solely by user equipment 1400. At least some operations of the method can be performed by one or more other entities.

User equipment 1400 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 1400 may be the processing circuitry 220 shown in FIG. 2. In some embodiments, the processing circuitry of user equipment 1400 may be the processor 401 shown in FIG. 4. The processing circuitry may be configured to execute program code stored in memory 415 shown in FIG. 4, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1410, computing unit 1420, calculating unit 1430, and sending unit 1440, and any other suitable units of user equipment 1400 to perform corresponding functions according one or more embodiments of the present disclosure, such as a transmitter and a receiver.

As illustrated in FIG. 14, user equipment 1400 includes the receiving unit 1410, the computing unit 1420, the calculating unit 1430, and the sending unit 1440. The receiving unit 1410 may be configured to receive, from a first network node, a connection release message including a current integrity key and instructions for computing a hash value for data to be included in a connection request message. In some embodiments, the first network node may be a source network node. In some embodiments, the receiving unit 1410 further receives instructions for computing the hash value from a second network node. In some embodiments, the second network node may be a target network node.

The computing unit 1420 may be configured to compute the hash value based the instructions included in the connection release message. In some embodiments, the hash value may be computed by a radio resource control (RRC) layer, and the data is provided by a lower layer to the RRC layer. In some embodiments, the hash value may be computed by a lower layer and provided to a RRC layer. In some embodiments, the integrity key used to calculate the token may be a new integrity key derived from the current integrity key. In some embodiments, the integrity key used to calculate the token may be the current integrity key used in a previous connection to the first network node.

The calculating unit 1430 may be configured to calculate a token based on the hash value and an integrity. In some embodiments, the integrity key used to calculate the token may be a new integrity key derived from the current integrity key. In some embodiments, the integrity key used to calculate the token may be the current integrity key used in a previous connection to the first network node.

The sending unit 1440 may be configured to send, to the second network node, the connection request message including the token.

Figure 15:
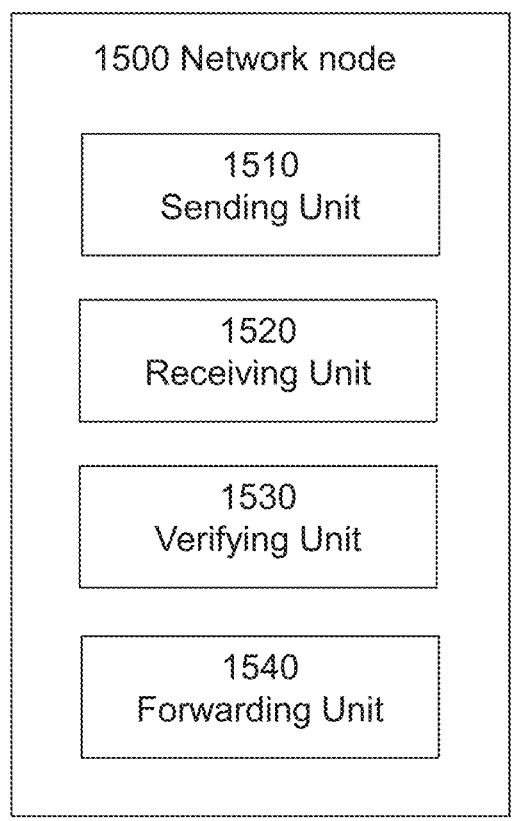
FIG. 15 illustrates a block schematic of an example network node, in accordance with certain embodiments.

FIG. 15 is a schematic block diagram of an exemplary network node 1500 in a wireless network, in accordance with certain embodiments. In some embodiments, the wireless network may be the wireless network 206 shown in FIG. 2. The network node may be implemented in a wireless device (e.g., wireless device 210 shown in FIG. 2). The network node 1500 is operable to carry out the example method described with reference to FIG. 15 and possibly any other processes or methods disclosed herein. It is also to be understood that the method of FIG. 15 is not necessarily carried out solely by the network node 1500. At least some operations of the method can be performed by one or more other entities.

Network node 1500 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1500 may be the processing circuitry 270 shown in FIG. 2. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending unit 1510, receiving unit 1520, verifying unit 1530, and forwarding unit 1540, and any other suitable units of network node 1500 to perform corresponding functions according one or more embodiments of the present disclosure, such as a receiver and a transmitter.

As illustrated in FIG. 15, network node 1500 includes the sending unit 1510, the receiving unit 1520, the verifying unit 1530, and the forwarding unit 1540. The sending unit 1510 may be configured to send, to a UE, a preamble message after the UE is being released by a second network node from a previous connection. In some embodiments, the network node including the sending unit 1510 may be a target network node, and the second network node may be a source network node.

The receiving unit 1520 may be configured to receive, from a user equipment, a connection request message including a token calculated based a hash value and an integrity key. In some embodiments, the hash value may be computed by a radio resource control (RRC) layer, and the data is provided by a lower layer to the RRC layer. In some embodiments, the hash value may be computed by a lower layer and provided to a RRC layer. In some embodiments, the integrity key used to calculate the token may be a new integrity key derived from the current integrity key. In some embodiments, the integrity key used to calculate the token may be the current integrity key used in a previous connection to the first network node.

The verifying unit 1530 may be configured to verify the token included in the connection request message by computing the hash value. In some embodiments, the verifying unit 1530 may verify the token by determining, at the first network node, that the token uses the current integrity key; forwarding, to the second network node, the token to verify the token; and receiving, at the first network node, a verified token. In some embodiments, the verifying unit 1530 may verify the token by determining, at the first network node, that the hash value is computed before the data is ciphered; forwarding, to the second network node, a ciphered data for deciphering; receiving, from the second network node at the first network node, a deciphered data; and verifying, at the first network node, the token with the deciphered data. In some embodiments, the verifying unit 1530 may verify the token by determining, at the first network node, that the hash value is computed after the data is ciphered; forwarding, to the second network node, the hash value for verifying the token; and receiving, from the second network node at the first network node, a verified token.

The forwarding unit 1540 may be configured to forward, to a gateway, the data in response to verifying the token. In some embodiments, the gateway may be S-GW.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that having a token, which is calculated based on a hash code of uplink data to be included in a RRC message, in the RRC message to improve data transmission security. Furthermore, another advantage of features herein is that a fixed-size hash code in the present disclosure may provide an efficient way to reduce transmission overhead by avoiding data transmission between network nodes for verifying the token.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for improving data transmission security at a network node, comprising:
    sending, from a first network node to a user equipment, a preamble message after the user equipment is released by a second network node from a previous connection;
    receiving, from a user equipment at the first network node, a connection request message including a token calculated based a hash value and an integrity key, wherein the hash value represents data included in the connection request message;
    verifying, at the first network node, the token included in the connection request message by computing the hash value; and
    forwarding, from the first network node to a gateway, the data in response to verifying the token.

2. The method according to claim 1, wherein the integrity key is a new integrity key derived at the user equipment.

3. The method according to claim 1, wherein the integrity key is a current integrity key which is used in the previous connection to the second network node.

4. The method according to claim 3, wherein verifying the token comprises:
- determining, at the first network node, that the token uses the current integrity key;
- forwarding, to the second network node, the token to verify the token; and
- receiving, at the first network node, a verified token.

5. The method according to claim 1, wherein verifying the token comprises:
- determining, at the first network node, that the hash value is computed before the data is ciphered;
- forwarding, to the second network node, a ciphered data for deciphering;
- receiving, from the second network node at the first network node, a deciphered data; and
- verifying, at the first network node, the token with the deciphered data.

6. The method according to claim 1, wherein verifying the token comprises:
- determining, at the first network node, that the hash value is computed after the data is ciphered;
- forwarding, to the second network node, the hash value for verifying the token; and
- receiving, from the second network node at the first network node, a verified token.

7. The method according to claim 1, wherein the hash value is computed by a RRC layer, and the data is provided by a lower layer to the RRC layer.

8. The method according to claim 1, wherein the hash value is computed by a lower layer and provided to a RRC layer.

* * * * *